United States Patent
Simanapalli et al.

(10) Patent No.: US 7,437,396 B2
(45) Date of Patent: Oct. 14, 2008

(54) APPARATUS AND METHOD FOR GENERATING TRANSFORMS

(75) Inventors: Siva Simanapalli, Santa Clara, CA (US); Inching Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 883 days.

(21) Appl. No.: 10/815,463

(22) Filed: Mar. 31, 2004

(65) Prior Publication Data

US 2005/0222790 A1   Oct. 6, 2005

(51) Int. Cl.
*G06F 17/14* (2006.01)
(52) U.S. Cl. .................................... 708/404
(58) Field of Classification Search ................ 708/404
See application file for complete search history.

(56) References Cited

U.S. PATENT DOCUMENTS

| | | | | |
|---|---|---|---|---|
| 3,638,004 A * | 1/1972 | Sloane et al. ............... | 708/403 |
| 4,241,411 A * | 12/1980 | Krasner et al. .............. | 708/404 |
| 4,689,762 A * | 8/1987 | Thibodeau, Jr. ............. | 708/409 |
| 4,698,769 A * | 10/1987 | McPherson et al. ......... | 708/312 |
| 5,313,413 A * | 5/1994 | Bhatia et al. ................ | 708/408 |
| 6,330,580 B1 * | 12/2001 | Giaume et al. .............. | 708/406 |
| 6,366,936 B1 * | 4/2002 | Lee et al. ..................... | 708/404 |
| 6,408,319 B1 * | 6/2002 | Cambonie .................... | 708/406 |
| 7,164,723 B2 * | 1/2007 | Sunwoo ....................... | 375/260 |
| 2002/0065862 A1 * | 5/2002 | Nakanishi .................... | 708/401 |

* cited by examiner

*Primary Examiner*—David H Malzahn
(74) *Attorney, Agent, or Firm*—Schwegman, Lundberg & Woessner, P.A.

(57) ABSTRACT

An apparatus includes a primary information storage unit, a secondary information storage unit, and an information processing unit. The primary information storage unit has a primary storage capacity. The secondary information storage unit has a secondary storage capacity. The secondary storage capacity is less than the primary storage capacity. The secondary information storage unit receives information from the primary information storage unit and the information processing unit processes the information to form a transform.

24 Claims, 10 Drawing Sheets

APPARATUS AND METHOD FOR GENERATING TRANSFORMS

FIELD

The present subject matter relates to generating transforms.

BACKGROUND

Transforms, such as the fast Fourier transform, are signal processing algorithms used in communication systems and other systems that make use of frequency domain signal processing. Some signal processing algorithms are designed to operate with a single large memory. Other algorithms operate with smaller memories. However, the algorithms designed for small memories do not generate transforms as efficiently as desired for use in modem communication systems. For these and other reasons there is a need for an apparatus and method for generating transforms efficiently in a memory constrained environment.

DESCRIPTION

In the following description of some embodiments of the present invention, reference is made to the accompanying drawings which form a part hereof, and in which are shown, by way of illustration, specific embodiments of the present invention which may be practiced. In the drawings, like numerals describe substantially similar components throughout the several views. These embodiments are described in sufficient detail to enable those skilled in the art to practice the present invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

Figure 1:
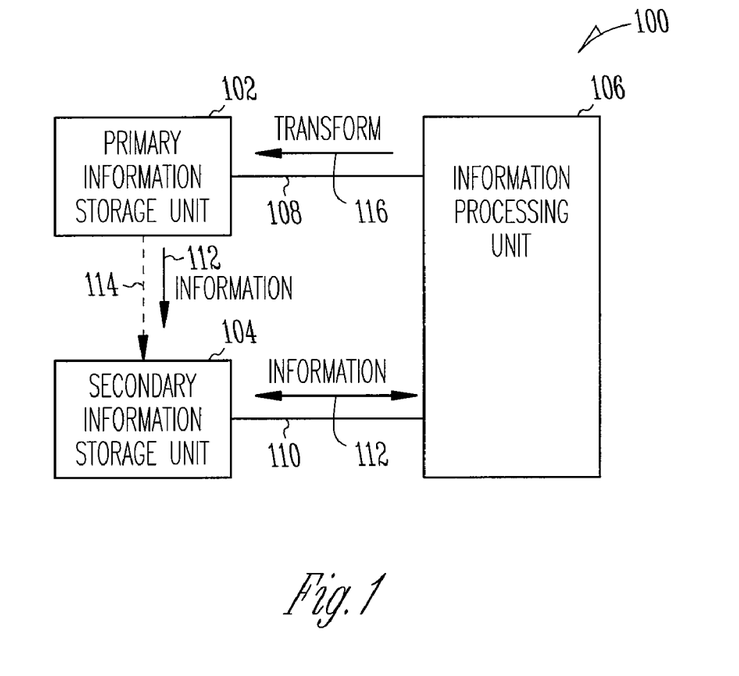
FIG. 1 is a block diagram of an apparatus including a primary information storage unit, a secondary information storage unit, and an information processing unit in accordance with some embodiments of the present invention.

FIG. 1 is a block diagram of an apparatus 100 including a primary information storage unit 102, a secondary information storage unit 104, and an information processing unit 106 in accordance with some embodiments of the present invention. The information processing unit 106 is coupled to the primary information storage unit 102 and the secondary information storage unit 104. The information processing unit 106 is coupled to the primary information storage unit 102 through a channel 108. The information processing unit 106 is coupled to the secondary information storage unit 104 through a channel 110. A channel is an information transmission path. In some embodiments, the channels 108 and 110 include information processing elements (not shown). In other embodiments, the channels 108 and 110 do not include information processing elements but include a transmission medium, such as transmission line or free space. The secondary information storage unit 104 is coupled to the primary information storage unit 102 either directly or indirectly. The primary information storage unit 102 is directly coupled to the secondary information storage unit 104 when information flowing from the primary information storage unit 102 to the secondary information storage unit 104 does not pass through active devices such as transistors or logic gates. The primary information storage unit 102 is indirectly coupled to the secondary information storage unit 104 when the information flowing from the primary information storage unit 102 to the secondary information storage unit 104 passes through active devices such as transistors or logic gates.

The primary information storage unit 102 is not limited to a particular type of information storage. In some embodiments, the primary information storage unit 102 includes semiconductor memory, such as a static random access memory, a flash memory, or a dynamic random memory. A static random access memory is a random access memory that requires a constant supply of power in order to hold its content, but does not require refresh circuitry. A flash memory is non-volatile (i.e., information is not lost when power is removed from a flash memory) memory. Dynamic random access memory is volatile (i.e., information is lost when power is removed from a dynamic random access memory)

memory. In other embodiments, the primary information storage unit 102 includes a magnetic random access memory. A magnetic random access memory is a non-volatile memory in which information is stored as magnetic fields. In still other embodiments, the primary information storage unit 102 includes semiconductor memory and magnetic memory. The primary information storage unit 102 has a primary storage capacity. The primary storage capacity is the amount of information that can be stored in the primary information storage unit 102. Primary storage capacity is not limited to a particular unit of measure. Exemplary units of measure of primary storage capacity include total bytes, user data, or number of sample points.

The secondary information storage unit 104 is not limited to a particular type of information storage. In some embodiments, the secondary information storage unit 104 includes semiconductor memory, such as static random access memory, flash memory, or dynamic random memory. In other embodiments, the secondary information storage unit 104 includes a magnetic random access memory. In still other embodiments, the primary information storage unit 102 includes semiconductor memory and magnetic memory. The secondary storage unit 104 has a secondary storage capacity. The secondary information storage capacity is the amount of information that can be stored in the secondary storage unit 104. Exemplary units of measure of storage capacity include total bytes, user data, or number of sample points.

In the apparatus 100, the secondary storage capacity is less than the primary storage capacity. The secondary storage capacity may be tailored to the particular problem of application of the apparatus 100. A relatively small secondary storage capacity permits forming many sets of the information processing unit 106 and the secondary information storage unit 104 on a die (not shown) for parallel processing of the information stored in the primary information storage unit 102.

In the apparatus 100, the time required for the information processing unit 106 to access information in the primary information storage unit 102 is greater than the time required for the information processing unit 106 to access information in the secondary information storage unit 104.

The information processing unit 106 is not limited to a particular type of information processing unit. In some embodiments, the information processing unit 106 includes a processor. Exemplary processors suitable for use in connection with the apparatus 100 include complex instruction set processors, reduced instruction set processors, very long instruction word processors, and digital signal processors. In other embodiments, the information processing unit 106 includes processing elements designed to meet a particular processing requirement. For example, the information processing unit 106 may include processing elements to execute butterfly computations when forming a transform, such as a Fourier transform, of information, such as a sampled signal.

In operation, the primary information storage unit 102 provides information 112, such as data points in a sampled signal (not shown), over a channel 114 (shown in a directed dashed line) to the secondary information storage unit 104. The secondary information storage unit 104 provides the information 112 over the channel 110 to the information processing unit 106. In some embodiments, the information 112 provided by the secondary information storage unit 104 includes fixed length blocks. In other embodiments, the information 112 provided by the secondary information storage unit 104 includes a first stream of information blocks in which each of the blocks has a first fixed length and a second stream of information blocks in which each of the blocks has a second fixed length. The first fixed length is different from the second fixed length. Thus, information streams meeting different standards can be processed by the information processing unit 106. The information processing unit 106 processes the information 112 to form a transform 116 of the information 112. Depending upon the secondary information storage unit capacity, the N point transform can be computed either in one-shot or in multiple operations. In some embodiments, the transform 116 includes a fast Fourier transform. The information processing unit 106 provides the transform 116 to the primary information storage unit 102 where the transform 116 is stored.

Figure 2:
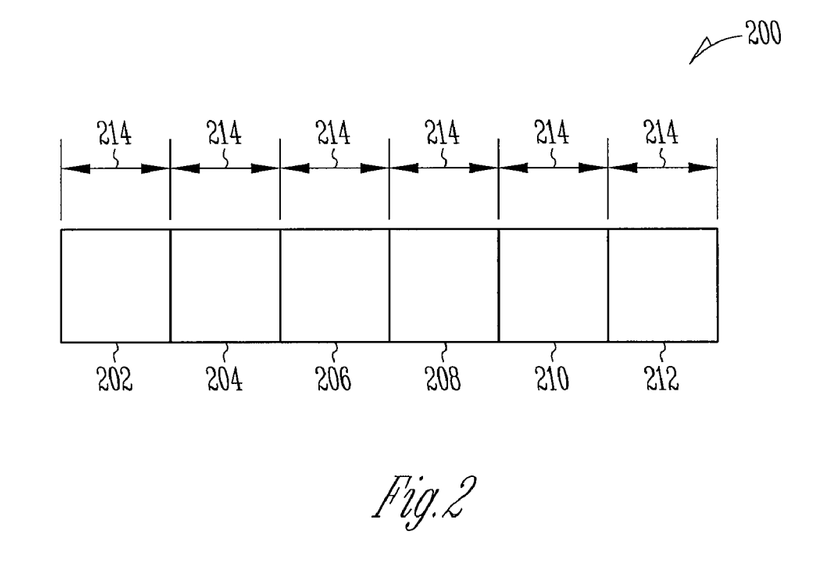
FIG. 2 is a diagram of information blocks in which each of the information blocks has a fixed length in accordance with some embodiments of the present invention.

FIG. 2 is a diagram of information blocks 200 in which each of the information blocks 202, 204, 206, 208, 210, and 212 has a fixed length 214 in accordance with some embodiments of the present invention. The fixed length 214 (the number of information units in each block) of each of the information blocks 202, 204, 206, 208, 210, and 212 is the same. Each of the information blocks 202, 204, 206, 208 210, and 212 includes information, such as an N point signal. The information blocks 200 are not limited to a particular block length. In some embodiments, the fixed length 214 is 256 information units. In other embodiments, the fixed length 214 is 4096 information units. Providing scaling for different fixed length capability allows the apparatus 100, shown in FIG. 1, to process information according to different communication standards.

Figure 3:
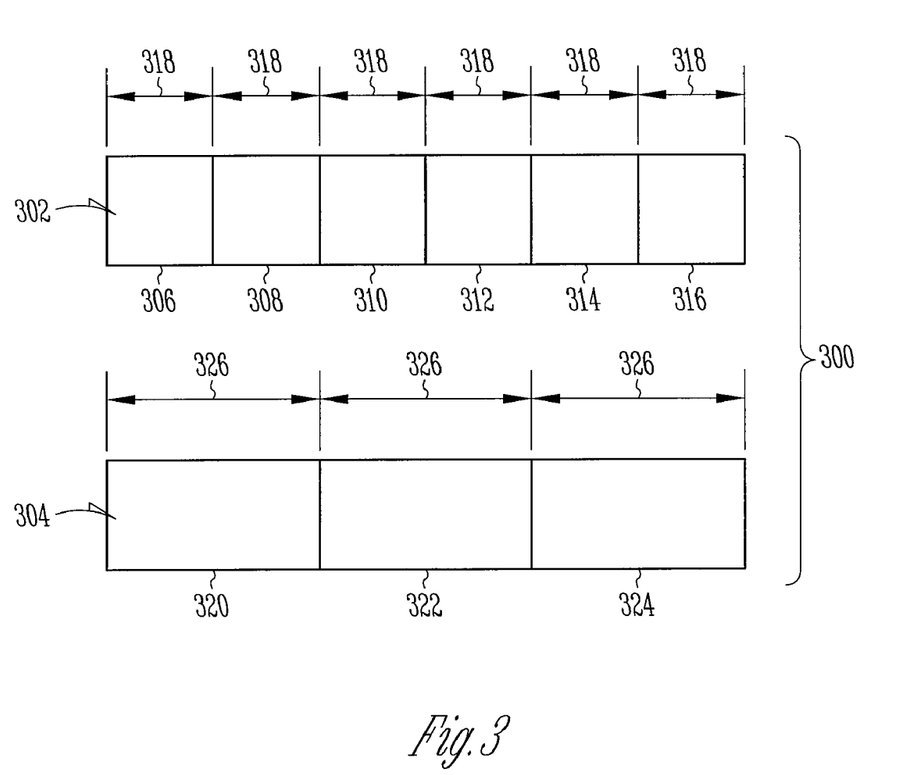
FIG. 3 is a diagram of information streams having different fixed lengths in accordance with some embodiments of the present invention.

FIG. 3 is a diagram of information streams 300 having different fixed lengths in accordance with some embodiments of the present invention. The information streams 300 include an information stream 302 and an information stream 304. The information stream 302 includes information blocks 306, 308, 310, 312, 314, and 316. Each of the information blocks 306, 308, 310, 312, 314, and 316 has a fixed length 318. The fixed length 318 of each the information blocks 306, 308, 310, 312, 314, and 316 is equal to the same value. The information stream 304 includes information blocks 320, 322, and 324. Each of the information blocks 320, 322, and 324 has a fixed length 326. The fixed length 326 of each of the information blocks 320, 322, and 324 is equal to the same value. The value of the fixed length 318 of the information stream 302 is not equal to the value of the fixed length 326 of the information stream 304.

Figure 4:
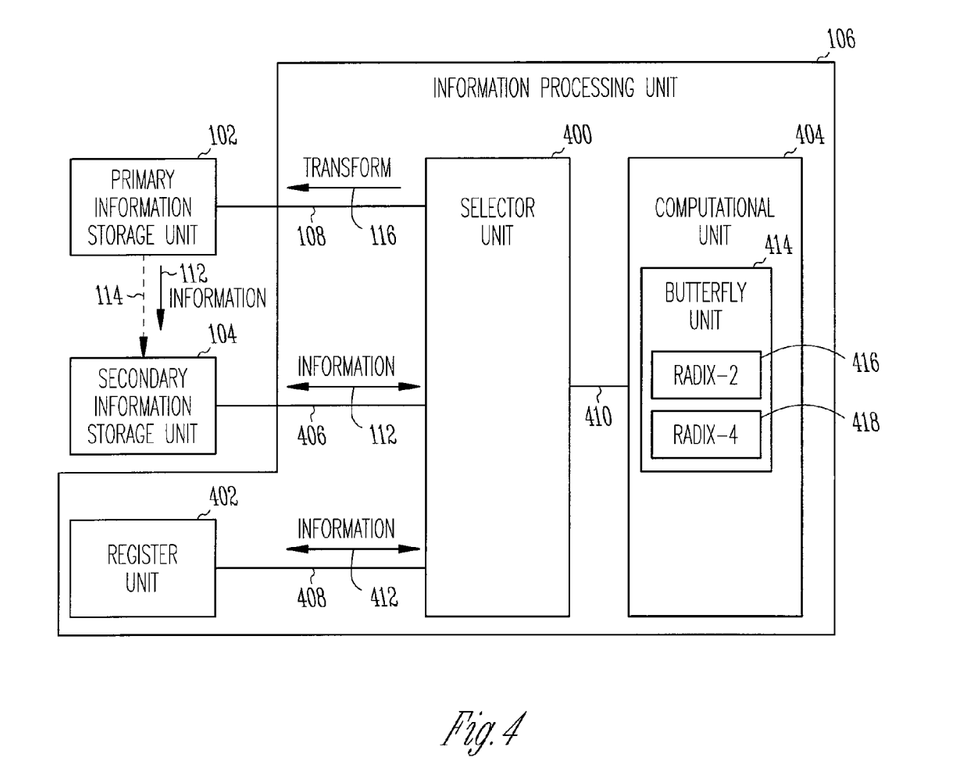
FIG. 4 is a block diagram of the information processing unit, shown in FIG. 1, including a selector unit, a register unit, and a computational unit coupled to the primary information storage unit, shown in FIG. 1, and the secondary information storage unit, shown in FIG. 1, in accordance with some embodiments of the present invention.

FIG. 4 is a block diagram of the information processing unit 106 (shown in FIG. 1) including a selector unit 400, a register unit 402, and a computational unit 404 coupled to the primary information storage unit 102 (shown in FIG. 1) and the secondary information storage unit 104 (shown in FIG. 1) in accordance with some embodiments of the present invention. The selector unit 400 is coupled to the primary information storage unit 102, the secondary information storage unit 104, the register unit 402, and the computational unit 404. The selector unit 400 is coupled to the primary information storage unit 102 through the channel 108. The selector unit 400 is coupled to the secondary information storage unit 104 through a channel 406. The selector unit 400 is coupled to the register unit 402 through a channel 408. The selector unit is coupled to the computational unit 404 through a channel 410.

The selector unit 400 includes logic (not shown) for routing the information 112 from the secondary information storage unit 104 (shown in FIG. 1) and information 412 from the register unit 402 to the computational unit 406. In some embodiments, the logic included in the selector unit 400 includes logic gates such AND gates, OR gates, NAND gates, NOR gates, and EXCLUSIVE-OR gates.

The register unit 402 includes storage elements (not shown) and multiplexor elements (not shown). The register unit 402 provides staging and routing for the information 412 to be routed through the selector unit 400 to the computational unit 404. Providing the register unit 402 to stage and route the information 412 allows the computational unit 404 to have a higher throughput when compared with systems that do not provide staging. The register unit 402 is not limited to staging and routing a particular type of information. Exemplary information staged and routed by the register unit 402 includes real numbers and imaginary numbers (including real and imaginary parts).

The computational unit 404, in some embodiments, includes a butterfly unit 414. In some embodiments, the butterfly unit 414 includes a radix-2 butterfly unit 416. In some embodiments, the butterfly unit 414 includes a radix-4 butterfly unit 418. In still other embodiments, the butterfly unit 414 includes a radix-2 and a radix-4 butterfly unit. In still other embodiments, the butterfly unit 414 includes radix-2 butterfly units and radix-4 butterfly units and is configurable as a radix-2 butterfly unit or a radix-4 butterfly unit. In still other embodiments, the butterfly unit 414 includes radix-2 butterfly units and radix-4 butterfly units and is configurable as a radix-2 butterfly unit and a radix-4 butterfly unit. Thus, the butterfly unit 414 is a reconfigurable circuit for radix-2 or radix-4 processing or for radix-2 and radix-4 processing. The butterfly unit 414 provides one computation provided by the computational unit 404.

The primary information storage unit 102, the secondary information storage unit 104, and the register unit 402 each store information during the process of forming the transform 116. The primary information storage unit 102 holds data, such as N point data to be transformed. The secondary information storage unit 104 holds a subset of the data held in the primary information storage unit 102. The register unit 402 holds temporary or intermediate data that results form processing the data from the secondary information storage unit 104. Hence, in operation, data to be transformed is initially stored in the primary information storage unit 102. This data is divided into subsets and the subsets are delivered to the secondary information storage unit 104. Temporary or intermediate data is returned to the register unit 402 from the computational unit 404 via the selector unit 400. The temporary or intermediate data is delivered to the computation unit 404 via the selector unit 400 when required for further processing.

Figure 5:
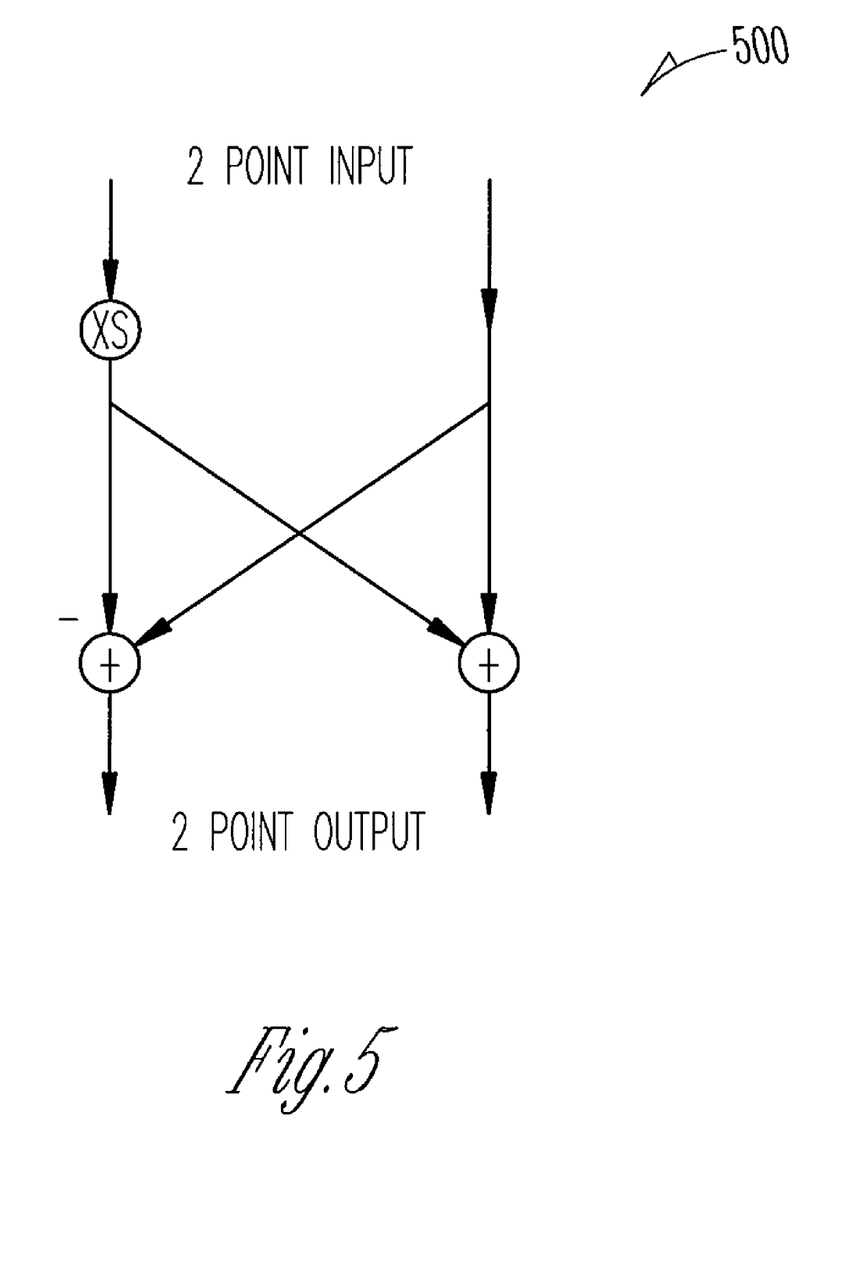
FIG. 5 is a flow diagram of a radix-2 butterfly unit in accordance with some embodiments of the present invention.

FIG. 5 is a flow diagram of a radix-2 butterfly unit 500 in accordance with some embodiments of the present invention. The radix-2 butterfly unit 500 is the basic calculation element in performing the fast Fourier transform. The radix-2 butterfly unit 500 receives two complex points and converts them into two other complex points. Those skilled in the art will appreciate that the radix-2 butterfly unit 500 shown in FIG. 5 is illustrative only and that a butterfly unit suitable for performing computations on complex numbers may be derived from the radix-2 butterfly unit 500 shown in FIG. 5. A radix-4 butterfly unit (not shown) is formed by combining four radix-2 butterfly units.

Figure 6:
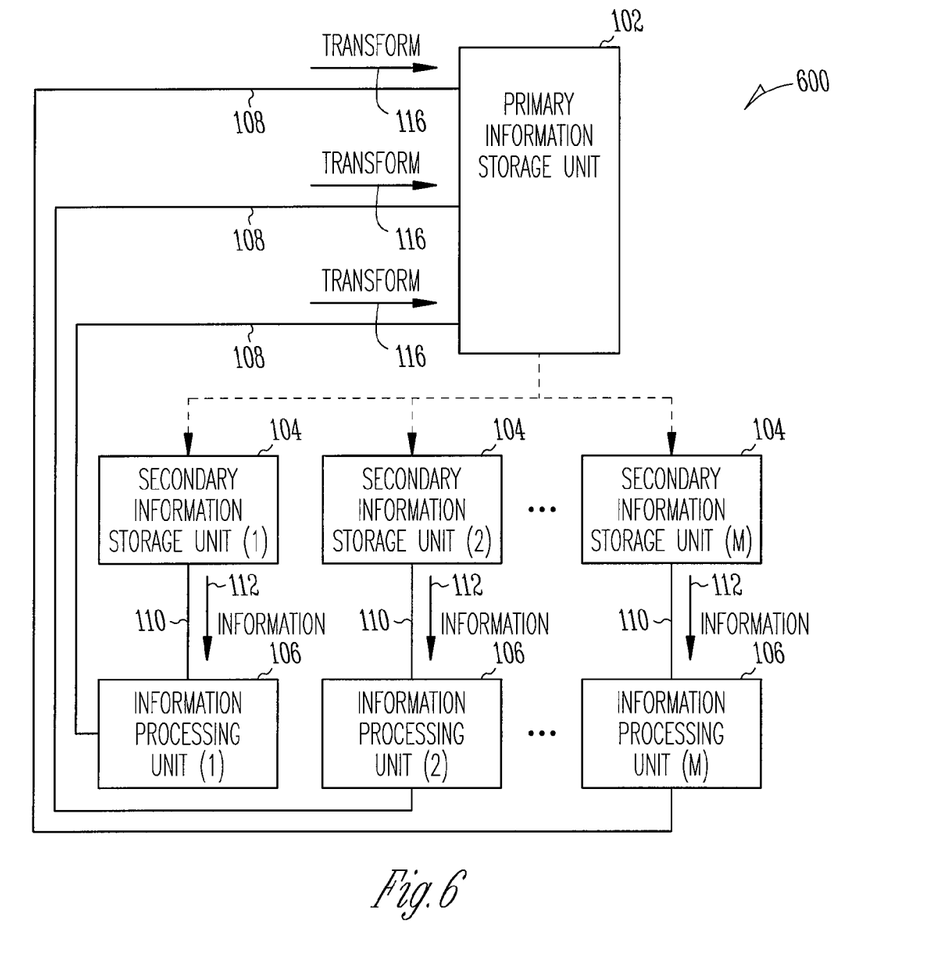
FIG. 6 is a block diagram of an apparatus showing the primary information storage unit, shown in FIG. 1, M iterations of the information processing units, shown in FIG. 1, and M iterations of the secondary information storage units, also shown in FIG. 1 in accordance with some embodiments of the present invention.

FIG. 6 is a block diagram of an apparatus 600 showing the primary information storage unit 102, shown in FIG. 1, M iterations of the information processing unit 106, shown in FIG. 1, and M iterations of the secondary information storage unit 104, also shown in FIG. 1, in accordance with some embodiments of the present invention. The connections and operation of each of the M iterations of the information processing unit 106 and the M iterations of the secondary information storage unit 104 are as shown in FIG. 1 and described above. The apparatus 600 permits parallel processing of the information 112 provided by the primary information storage unit 102 through the M iterations of the secondary information storage unit 104 to the M iterations of the information processing unit 106. The secondary information storage units 104 provide the information 112 over the channels 110 to the information processing units 106. The information processing units 106 generate and provide the transforms 116 over the channels 108 to the primary information storage unit 102. Those skilled in the art will appreciate that the size of each of the M iterations of the secondary information storage unit 104 may be scaled along with the number M of iterations of the secondary information storage unit 104 and the number M of iterations of the information processing unit 106. The results may be partial results or final results depending on the stage.

Figure 7:
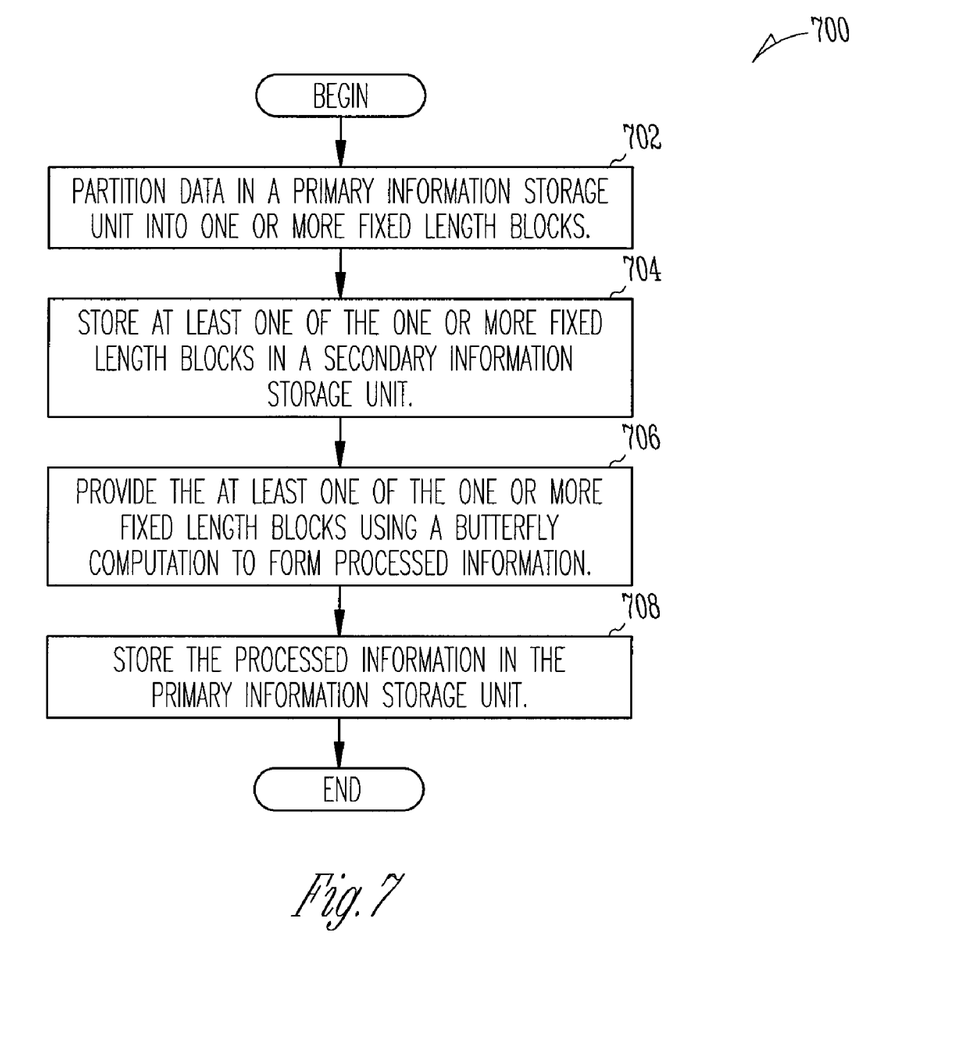
FIG. 7 is a flow diagram of a method for processing information in accordance with some embodiments of the present invention.

FIG. 7 is a flow diagram of a method 700 for processing information in accordance with some embodiments of the present invention. The method 700 includes partitioning data in a primary information storage unit into one or more fixed length blocks (block 702), storing at least one of the one or more fixed length blocks in a secondary information storage unit (block 704), processing the at least one of the one or more fixed length blocks using a butterfly computation to form processed information (block 706), and storing the processed information in the primary information storage unit (block 708).

In some embodiments, processing the at least one of the one or more fixed length blocks using the butterfly computation to form the processed information includes performing a radix-2 butterfly computation.

In some embodiments, processing the at least one of the one or more fixed length blocks using the butterfly computation to form the processed information comprises performing a radix-4 butterfly computation.

In some embodiments, processing the at least one of the one or more fixed length blocks using the butterfly computation to form the processed information comprises applying a fast Fourier transform after applying a radix-2 butterfly computation and a radix-4 butterfly computation to the at least one of the one or more fixed length blocks.

Figure 8:
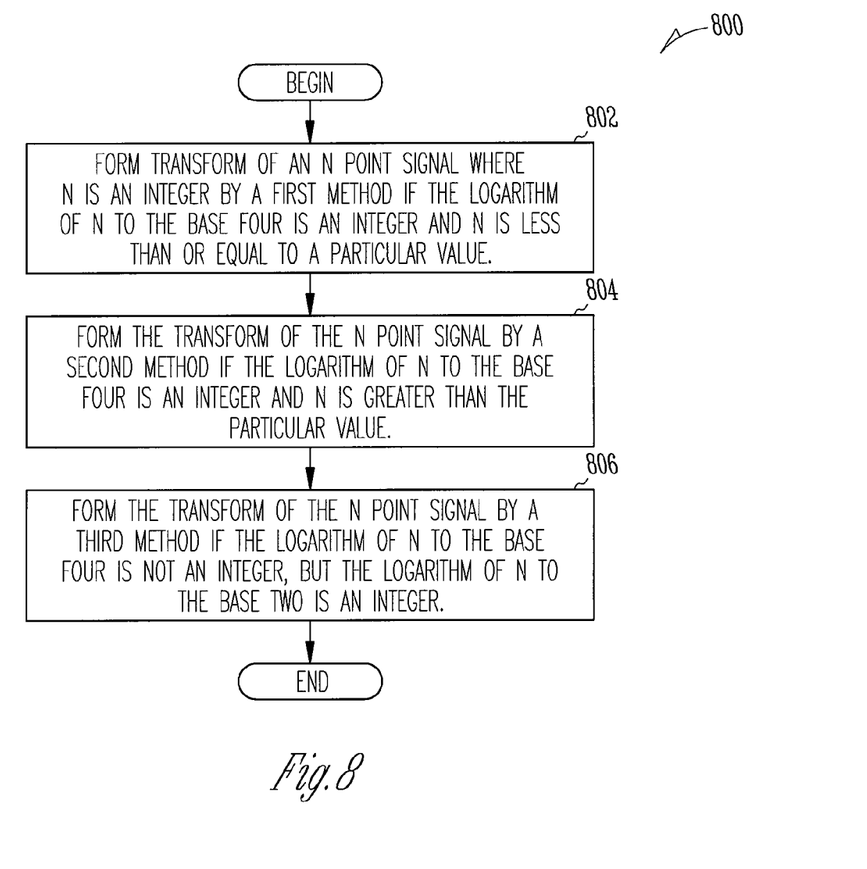
FIG. 8 is a flow diagram of a method for processing information in accordance with some embodiments of the present invention.

FIG. 8 is a flow diagram of a method 800 for processing information in accordance with some embodiments of the present invention. The method 800 includes forming a transform of an N point signal where N is an integer by a first method if the logarithm of N to the base four is an integer and N is less than or equal to a particular value (block 802), forming the transform of the N point signal by a second method if the logarithm of N to the base four is an integer and N is greater than the particular value (block 804), and forming the transform of the N point signal by a third method if the logarithm of N to the base four is not an integer, but the logarithm of N to the base two is an integer (block 806). The particular value referred to in block 802 is related to the size of the secondary information storage unit 104, shown in FIG. 1. For example, if the secondary information storage unit 104 stores 256 units of information, then the particular value is 256.

Figure 9:
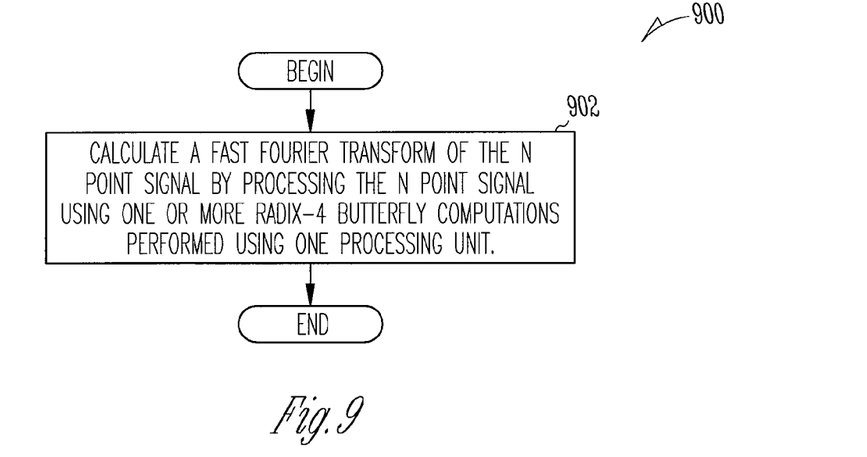
FIG. 9 is a flow diagram of a method, referred to as method one in FIG. 8, for processing information in accordance with some embodiments of the present invention.

FIG. 9 is a flow diagram of a method 900, referred to as method one in FIG. 8, for processing information in accordance with some embodiments of the present invention. The method 900 includes calculating a fast Fourier transform of the N point signal by processing the N point signal using one or more radix-4 butterfly computations performed using one processing unit (block 902).

Figure 10:
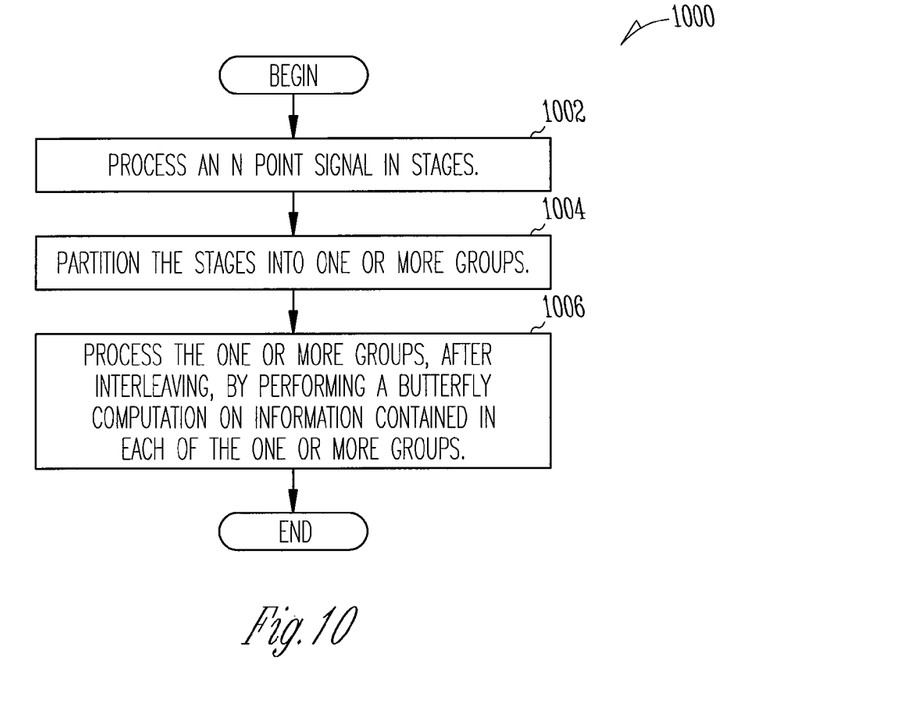
FIG. 10 is a flow diagram of a method, referred to as method two in FIG. 8, for processing information in accordance with some embodiments of the present invention.

FIG. 10 is a flow diagram of a method 1000, referred to as method two in FIG. 8, for processing information in accordance with some embodiments of the present invention. The method 1000 includes processing the N point signal in stages (block 1002), partitioning the stages into one or more groups (block 1004), processing the one or more groups, after interleaving, by performing a butterfly computation on information contained in each of the one or more groups (block 1006). Interleaving is arranging data in a different order. In some embodiments, interleaving is different for each stage.

Figure 11:
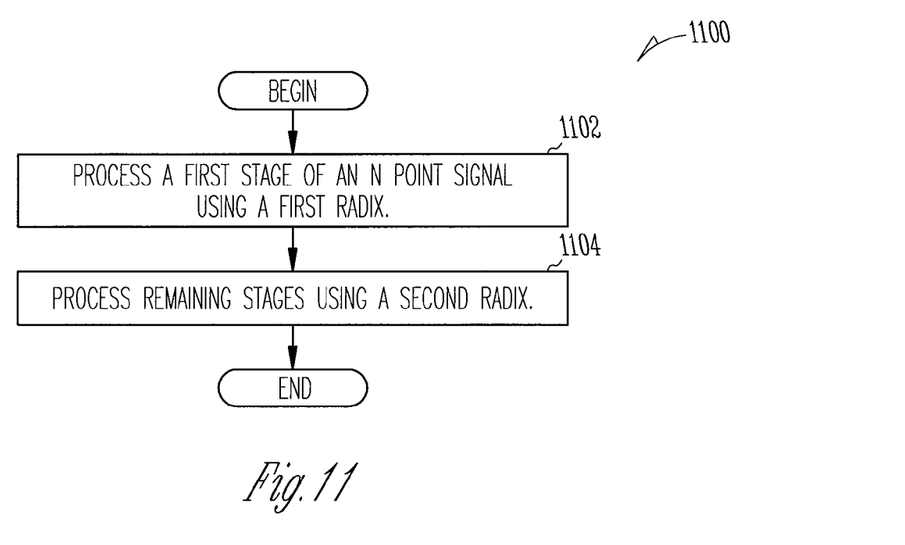
FIG. 11 is a flow diagram of a method, referred to as method three in FIG. 8, for processing information in accordance with some embodiments of the present invention.

FIG. 11 is a flow diagram of a method 1100, referred to as method three in FIG. 8, for processing information in accordance with some embodiments of the present invention. The method 1100 includes processing a first stage of the N point signal using a first radix (block 1102), and processing remaining stages using a second radix (block 1104). Processing a signal using a first radix and then a second radix is sometimes referred to as a mixed-radix process. A mixed radix process includes two or more radix bases in the process.

In some embodiments, processing remaining stages using the second radix includes using the first method or the second method. In some embodiments, processing remaining stages using a second radix includes calculating a fast Fourier transform of the N point signal by processing the N point signal using one or more radix-4 butterfly computations performed using one processing unit.

Figure 12:
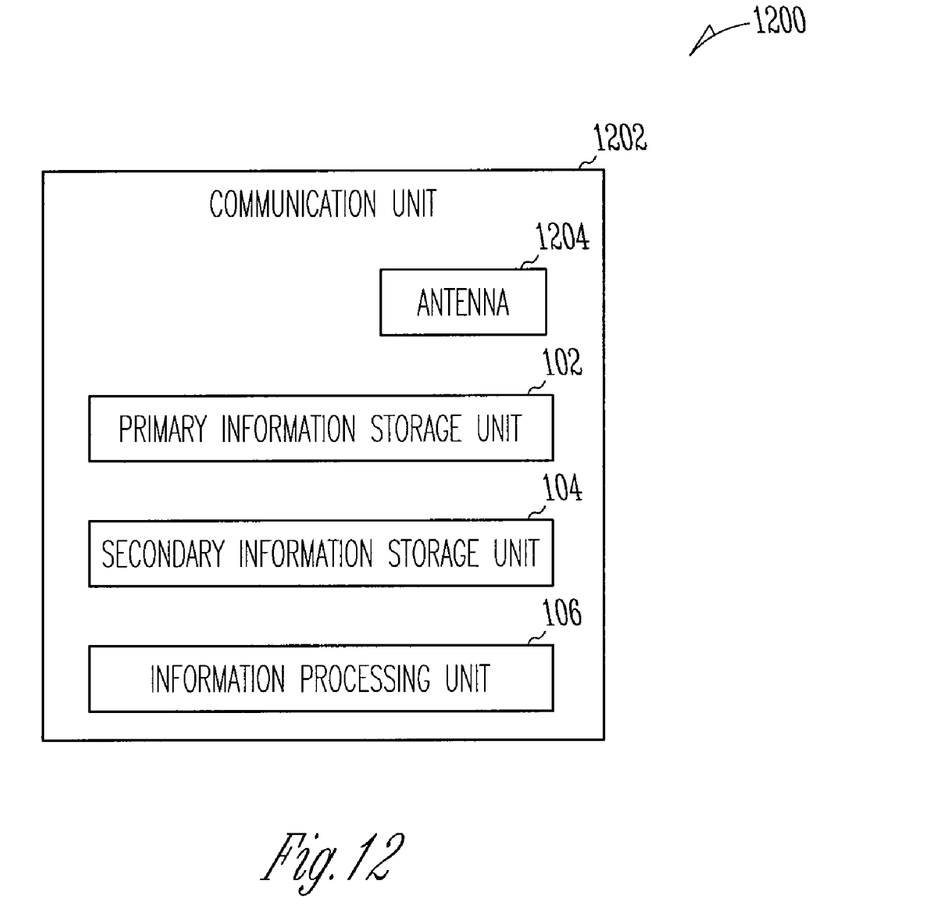
FIG. 12 in a block diagram of an apparatus including a communication unit having an omnidirection antenna, the primary information storage unit, shown in FIG. 1, the secondary information storage unit, shown in FIG. 1, and the information processing unit, shown in FIG. 1, in accordance with some embodiments of the present invention.

FIG. 12 is a block diagram of a system 1200 including a communication unit 1202 having an antenna 1204, the primary information storage unit 102, shown in FIG. 1, the secondary information storage unit 104, shown in FIG. 1, and the information processing unit 106, shown in FIG. 1, in accordance with some embodiments of the present invention. The primary information storage unit 102 is included in the communication unit 1202. The communication unit is not limited to a particular type of communication unit. Any device capable of sending, receiving, or sending and receiving information is suitable for use in connection with the system 1200. In some embodiments, the communication unit 1202 includes a cellular telephone. In some embodiments, the antenna 1204 includes an omnidirectional antenna. Other exemplary antennas suitable for use in connection with the system 1200 include monopole, dipole, patch, or directional antennas. In some embodiments the primary information storage unit 102 includes a magnetic memory. In some embodiments, the secondary information storage unit 104 includes a semiconductor memory. In some embodiments, the information processing unit 106 includes one or more computational units to perform a butterfly computation.

Figure 13:
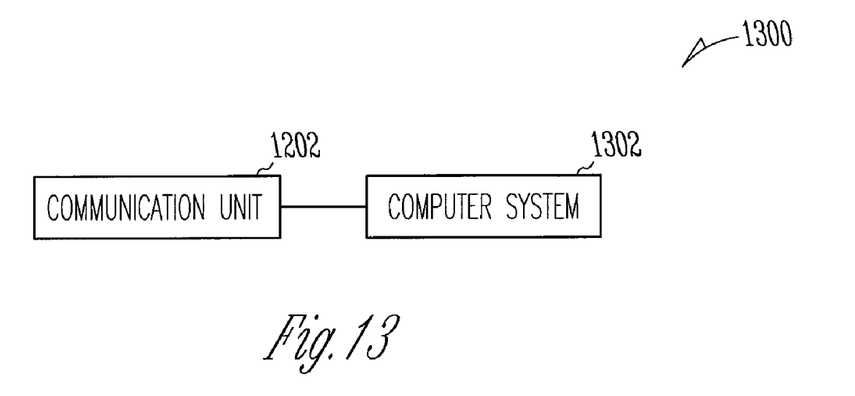
FIG. 13 is a block diagram of an apparatus including a communication unit, shown in FIG. 12, coupled to a computer system in accordance with some embodiments of the present invention.

FIG. 13 is a block diagram of an apparatus 1300 including the communication unit 1202, shown in FIG. 12, coupled to a computer system 1302 in accordance with some embodiments of the present invention. The computer system 1302 is not limited to a particular type of computer system. Exemplary computer systems include desktop systems, server systems, handheld, systems, mobile systems, embedded systems, and notebook systems. In operation, the communication unit 1202 and information sources (not shown) are external to the computer system 1302.

Figure 14:
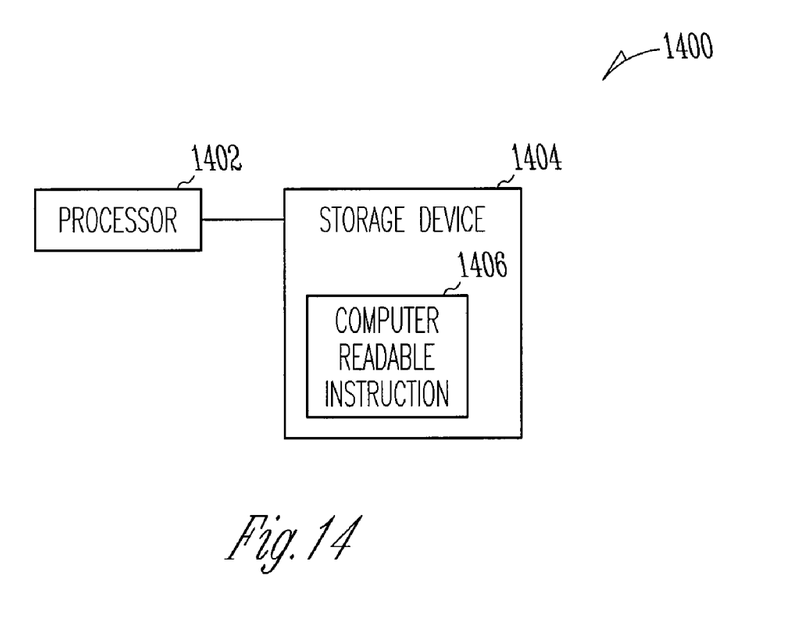
FIG. 14 is a block diagram of an apparatus including a processor and a storage device suitable for use in connection with some embodiments of the present invention.

FIG. 14 is a block diagram of an apparatus 1400 including a processor 1402 and a storage device 1404 suitable for use in connection with some embodiments of the present invention. The storage device 1404 can be encoded with computer-readable instructions 1406 that can be read and executed by the processor. The processor 1402 is coupled to the storage device 1404 such that information can be exchanged between the processor 1402 and the storage device 1404. Exemplary processors suitable for use in connection with the apparatus 1400 include complex instruction set processors, reduced instruction set processors, very long instruction word processors, and digital signal processors.

In some embodiments, the methods described above can be implemented on a computer or other electronic device. In other embodiments, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. An apparatus comprising:
a primary information storage unit having a primary storage capacity;
a secondary information storage unit to receive information stored in the primary information storage unit and the secondary information storage unit having a secondary storage capacity, the secondary storage capacity being less than the primary storage capacity; and
an information processing unit coupled to the primary information storage unit and to the secondary information storage unit, the information processing unit to receive information from the secondary information storage unit, to process the information to form a transform of the information, and to store the transform in the primary information storage unit, wherein the processing includes,
forming a transform of an N point signal where N is an integer by a first method if the logarithm of N to the base four is an integer and N is less than or equal to a particular value,
forming the transform of the N point signal by a second method if the logarithm of N to the base four is an integer and N is greater than the particular value, forming the transform of the N point signal by a third method if the logarithm of N to the base four is not an integer, but the logarithm of N to the base two is an integer.

2. The apparatus of claim 1, wherein the information processing unit includes a data selector unit coupled to the secondary information storage unit, a register unit, and a computational unit.

3. The apparatus of claim 2, wherein the secondary information storage unit is to provide information blocks having a fixed length to the information processing unit.

4. The apparatus of claim 2, wherein the secondary information storage unit is to provide a first stream of information blocks having a first fixed length and a second stream of information blocks having a second fixed length, the first fixed length being equal to, less than, or greater than the second fixed length.

5. The apparatus of claim 2, wherein the computational unit includes a butterfly unit.

6. The apparatus of claim 5, wherein the butterfly is configurable as either a radix-2 butterfly unit or a radix-4 butterfly unit.

7. The apparatus of claim 5, wherein the butterfly is configurable as a radix-2 butterfly unit and a radix-4 butterfly unit.

8. The apparatus of claim 1, wherein the transform of the information comprises a Fourier transform of the information.

9. A computer memory encoded with machine-readable instructions, wherein the instructions when read and executed comprise:
   partitioning data in a primary information storage unit into one or more fixed length blocks;
   storing at least one of the one or more fixed length blocks in a secondary information storage unit;
   processing the at least one of the one or more fixed length blocks using a butterfly computation to form processed information, wherein the processing includes,
   forming a transform of an N point signal where N is an integer by a first method if the logarithm of N to the base four is an integer and N is less than or equal to a particular value,
   forming the transform of the N point signal by a second method if the logarithm of N to the base four is an integer and N is greater than the particular value,
   forming the transform of the N point signal by a third method if the logarithm of N to the base four is not an integer, but the logarithm of N to the base two is an integer; and
   storing the processed information in the primary information storage unit.

10. The computer memory of claim 9, wherein processing the at least one of the one or more fixed length blocks using the butterfly computation to form the processed information comprises performing a radix-2 butterfly computation.

11. The computer memory of claim 9, wherein processing the at least one of the one or more fixed length blocks using the butterfly computation to form the processed information comprises performing a radix-4 butterfly computation.

12. The computer memory of claim 9, wherein processing the at least one of the one or more fixed length blocks using the butterfly computation to form the processed information comprises performing a radix-2 butterfly computation and performing a radix-4 butterfly computation.

13. A method comprising:
   forming a transform of an N point signal where N is an integer by a first method if the logarithm of N to the base four is an integer and N is less than or equal to a particular value;
   forming the transform of the N point signal by a second method if the logarithm of N to the base four is an integer and N is greater than the particular value; and
   forming the transform of the N point signal by a third method if the logarithm of N to the base four is not an integer, but the logarithm of N to the base two is an integer.

14. The method of claim 13, wherein forming the transform of the N point signal where N is an integer by the first method if the logarithm of N to the base four is an integer and N is less than or equal to the particular value comprises:
   calculating a fast Fourier transform of the N point signal by processing the N point signal using one or more radix-4 butterfly computations performed using one processing unit.

15. The method of claim 13, wherein forming the transform of the N point signal by a second method if the logarithm of N to the base four is an integer and N is greater than the particular value comprises:
   processing the N point signal in stages;
   partitioning the stages into one or more groups; and
   processing the one or more groups, after interleaving, by performing a butterfly computation on information contained in each of the one or more groups.

16. The method of claim 13, wherein forming the transform of the N point signal by a third method if the logarithm of N to the base four is not an integer, but the logarithm of N to the base two is an integer comprises:
   processing a first stage of the N point signal using a first radix; and
   processing remaining stages using a second radix.

17. The method of claim 16, wherein processing the first stage of the N point signal using the first radix comprises calculating a fast Fourier transform of the N point signal by processing the N point signal using one or more radix-2 butterfly computations performed using one processing unit.

18. The method of claim 16, wherein processing remaining stages using the second radix comprises using the first method or the second method.

19. A system comprising:
   a communication unit including an omnidirectional antenna to receive a signal;
   a primary information storage unit having a primary storage capacity, the primary information storage unit included in the communication unit;
   a secondary information storage unit to receive a signal stored in the primary information storage unit and the secondary information storage unit having a secondary storage capacity, the secondary storage capacity being less than the primary storage capacity; and
   an information processing unit coupled to the primary information storage unit and to the secondary information storage unit, the information processing unit to receive the signal from the secondary information storage unit, to process the signal to form a Fourier transform of the signal, and to store the Fourier transform of the signal in the primary information storage unit, wherein the processing includes,
   forming a transform of an N point signal where N is an integer by a first method if the logarithm of N to the base four is an integer and N is less than or equal to a particular value, forming the transform of the N point signal by a second method if the logarithm of N to the base four is an integer and N is greater than the particular value, forming the transform of the N point signal by a third method if the logarithm of N to the base four is not an integer, but the logarithm of N to the base two is an integer.

20. The system of claim 19, wherein the communication unit comprises a cellular telephone.

21. The system of claim 19, wherein the primary information storage unit comprises a semiconductor memory.

22. The system of claim 19, wherein the secondary information storage unit comprises a magnetic memory.

23. The system of claim 19, wherein the information processing unit comprises one or more computational units to perform a butterfly computation.

24. The system of claim 19, further comprising a computer system coupled to the communication unit.

* * * * *